United States Patent [19]

King et al.

[11] Patent Number: 5,098,616
[45] Date of Patent: Mar. 24, 1992

[54] METHOD FOR FORMING A CURVED PROJECTION SCREEN

[75] Inventors: Michael King; John Warren, both of Quebec, Canada

[73] Assignee: CAE Electronics Ltd., Montreal, Canada

[21] Appl. No.: 615,419

[22] Filed: Nov. 19, 1990

[51] Int. Cl.⁵ .............................. B29C 51/10
[52] U.S. Cl. ......................... 264/1.9; 264/2.7; 264/502; 264/544
[58] Field of Search .......... 264/1.9, 2.7, 502, 544, 264/573

[56] References Cited

U.S. PATENT DOCUMENTS

| | | | |
|---|---|---|---|
| 3,337,660 | 8/1967 | Bagby | 264/1.9 |
| 3,348,897 | 10/1967 | Hourdiaux | 350/125 |
| 3,384,432 | 5/1968 | Hourdiaux | 350/125 |
| 3,388,428 | 6/1968 | Buchholz | 264/544 |
| 3,632,185 | 1/1972 | Meanor | 350/125 |
| 3,992,841 | 11/1976 | Ward, Jr. | 156/258 |
| 3,998,522 | 12/1976 | Holzel | 350/125 |
| 4,022,522 | 5/1977 | Rain | 350/117 |
| 4,139,586 | 2/1979 | Gasson | 264/544 |
| 4,232,939 | 11/1980 | Kikuchi | 350/125 |
| 4,235,513 | 11/1980 | Vlahos | 350/125 |
| 4,473,355 | 9/1984 | Pongratz | 350/125 |
| 4,750,807 | 6/1988 | Chamayou dit Felix | 350/125 |

FOREIGN PATENT DOCUMENTS 892794  3/1962  United Kingdom ............... 264/573

Primary Examiner—James Lowe
Attorney, Agent, or Firm—Fishman, Dionne & Cantor

[57] ABSTRACT

A sheet of material for forming the screen is mounted on a cylindrical forming drum and is blow formed, by hot air under pressure, to provide a projection screen. The resulting screen is curved along the width thereof and curved along the length thereof, and is formed from a single, continuous, sheet of material so that the screen is a stand-alone screen.

7 Claims, 1 Drawing Sheet

METHOD FOR FORMING A CURVED PROJECTION SCREEN

BACKGROUND OF INVENTION

1. Field of the Invention

The invention relates to a process for forming a curved projection screen. More specifically, the invention relates to a process for forming such a screen from a single, continuous, sheet of material.

The invention also relates to a curved projection screen made in accordance with the inventive method.

2. Description of Prior Art

It is, of course, well known in the art that simulator systems require large display screens as is taught in, for example, U.S. Pat. No. 4,473,355, Pongratz, Sept. 25, 1984. However, the screen as taught in the '355 patent is an inflatable screen. As seen in FIG. 5 of the patent, a screen having a lenticulated surface is contemplated by the Pongratz patent.

U.S. Pat. No. 3,348,897, Hourdiaux, Oct. 24, 1967, teaches a curved projection screen which consists of a plurality of panels 20a to 20d (FIG. 2) held together with screw clamps 26. As is well known, screens made of a plurality of panels provide a certain degree of distortion at the joints between the panels.

U.S. Pat. No. 3,632,185, Meanor, Jan. 4, 1972 teaches a dome-shaped projection screen which is made of three sections which telescope into each other when the screen is not in use. This is illustrated in FIG. 2 of the patent.

A second patent of Hourdiaux, U.S. Pat. No. 3,384,432, May 21, 1968, teaches the connecting together of a plurality of rods to form curved screens.

A curved screen comprising a plurality of abutting panels is illustrated in U.S. Pat. No. 3,992,841, Ward Jr., Nov. 23, 1976. The edges of some of the panels overlap the edges of adjacent panels.

In U.S. Pat. No. 3,998,522, Holzel, Dec. 21, 1976 and U.S. Pat. No. 4,022,522, Rain, May 10, 1977, curved screens are formed by drawing a vacuum behind a membrane. In both cases, the membrane is supported on a peripheral frame which is enclosed by a back cover. A vacuum is drawn through the back cover whereupon the membrane will take on the shape of the peripheral frame. The main difference between the two patents is in the shapes of the frames. In both of these patents, the membrane must remain attached to the frame in order to maintain its shape.

Both U.S. Pat. No. 4,232,939, Kikuchi, Nov. 11, 1980 and U.S. Pat. No. 4,235,513, Vlahos, Nov. 25, 1980, teach projection screens having a lenticulated surface.

U.S Pat. No. 4,750,807, Chamayou dit Felix, June 14, 1988, teaches a curved screen which is formed from a plurality of triangular elements each of which is curved at the radius of curvature of the screen.

Not all of the patents above-discussed describe the method for making the screens as taught in the patents. However, certainly, none of them teach a method for making a stand-alone screen from a single, continuous, sheet of material.

SUMMARY OF INVENTION

It is therefore an object of the invention to provide a method for forming a curved screen which overcomes disadvantages of the prior art.

It is a more specific object of the invention to provide a method for forming a curved screen from a single, continuous, sheet of material.

It is also an object of the invention to provide a curved screen formed in accordance with the inventive method and comprising a stand-alone curved screen formed from a single, continuous, sheet of material.

In accordance with the invention, there is provided a method for forming a curved projection screen from a single, continuous sheet of material, comprising:

providing a cylindrical forming drum having a top end and a bottom end;

mounting a sheet of said material, having a length and a width, around the outer surface of the forming drum so that the width of the material extends from the bottom to the top end of the forming drum;

heating the mounted material to a forming temperature;

providing a blowing force through the forming drum against the material so that the material is formed into a shape having a curved cross section along the width thereof;

removing the formed material from the forming drum; and trimming the formed material as required.

Also, in accordance with the invention, there is provided a stand-alone curved screen formed from a single, continuous, sheet of material.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
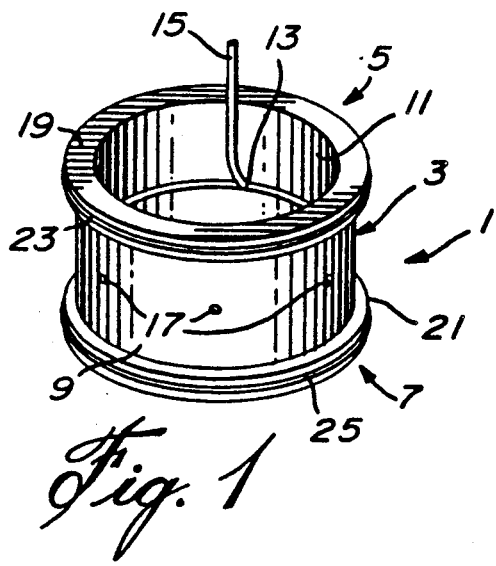
FIG. 1 is a perspective view of a forming drum for forming the curved screen in accordance with the invention.

Referring to FIG. 1, the apparatus for forming a screen in accordance with the invention, illustrated generally at 1, comprises a cylindrical drum 3 having a top end 5 and a bottom end 7. The cylindrical drum is a two-walled structure including an outer wall 9, and a concentric, spaced, inner wall 11 which define between them an air circulation space. Inner wall 11 includes an opening 13 to which is connected a hose 15 or the like. Outer wall 9 includes a plurality of openings 17. Preferably, the openings 17 are equally spaced around the equator of the cylindrical drum. Cylindrical drum 3 includes, at the top end 5 thereof, a stand-off rim 19 and, at the bottom end 7 thereof, a stand-off rim 21. Rims 19 and 21 are of equal diameter and each includes grooves for housing "O" rings 23 and 25 respectively.

Figure 2:
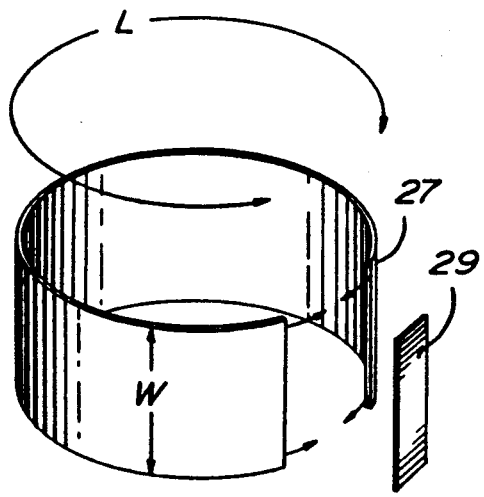
FIG. 2 illustrates the single, continuous, sheet of material curved into position for mounting on the forming drum.

As seen in FIG. 2, the sheet 27 of material from which the screen is to be formed has a length L and a width W. The width W is substantially equal to the distance between the top of stand-off rim 19 and the bottom of stand-off rim 21. Thus, when the sheet of material 27 is mounted on the cylindrical drum 3, the stand-off rims 19 and 21 will space the sheet 27 from the surface of the outer wall 9 of the cylindrical drum 3.

Figure 3:
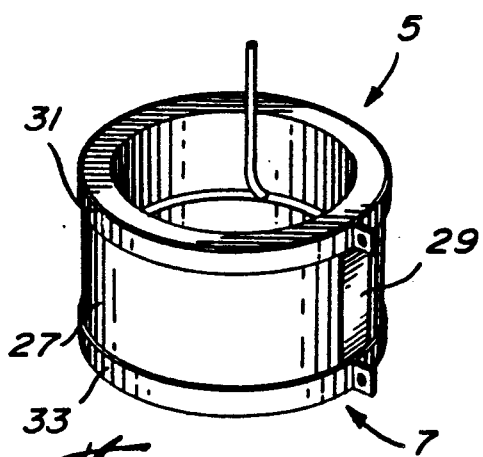
FIG. 3 illustrates the sheet of FIG. 2 mounted on the forming drum of FIG. 1.

The length L of the sheet is preferably somewhat less than the peripheral distance of the rims 19 and 21 so that, when the sheet 27 is mounted on the cylindrical drum 3, a gap will remain between the two ends of the sheet 27. This gap is covered with a joint cover strip 29. FIG. 3 illustrates the sheet 27 mounted on the cylindrical drum 3 with the joint cover strip 29 closing the gap between the ends of the sheet 27. As seen in FIG. 3, the width of the sheet 27 extends from the top end 5 of cylindrical drum 3 to the bottom end 7 thereof. As also seen in FIG. 3, the top end of the sheet 27 is clamped to the drum by a clamp 31, and the bottom end of the sheet 27 is clamped to the drum by a clamp 33.

The arrangement illustrated in FIG. 3, that is, the cylindrical drum with the sheet mounted thereon, is then heated to a forming temperature by any means well known in the art. For example, the arrangement illustrated in FIG. 3 could be disposed in a heating oven for this purpose. Alternatively, ultraviolet ray heating could be used.

Figure 4:
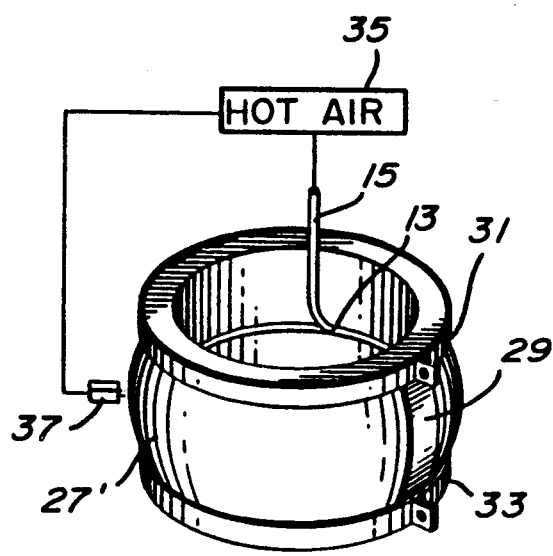
FIG. 4 illustrates the apparatus including a sensing mechanism for controlling the degree of curvature of the formed screen.

When the arrangement is at the forming temperature, a source 35 of hot air under pressure is connected to the input end of hose 15 as illustrated in FIG. 4. The hot air under pressure is then blown into the space between the walls 11 and 9 through opening 13 in wall 11. As the space is filled, air will emerge through openings 17, and the force of the emerging air will cause the sheet 27 to be formed into a shape which has a curved cross section along the width thereof as shown at 27' in FIG. 4. In order to ensure the correct degree of curvature of the curve, a sensor, for example a switch 37, is located at at least one position at the equator of sheet 27'. When the correct degree of curvature is obtained, the switch 37 will be activated to turn off the source 35 of hot air under pressure so that the forming process is terminated.

Figure 5:
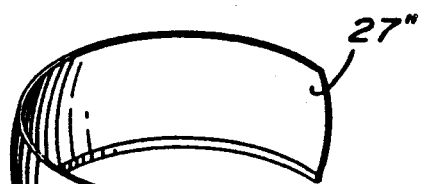
FIG. 5 illustrates a screen formed in accordance with the invention.

In a final step, the formed sheet 27 is removed from the cylindrical drum 3 and trimmed to size as shown at 27" in FIG. 5. As typically only up to 200° horizontally is required in the curved mirror, any distortion due to the joint in the original cylinder, resulting from the point cover strip 29, will be cut away.

Preferably, the screen is made of an acrylic material If it is desired to have a lenticulated surface, then the inner surface of the blank would be lenticulated by hot pressing standard sheets between specially shaped plattens.

The formed sheets can then be screen coated As there will be some distortion of the lenticulation due to the blow forming and the stretch which takes place around the equator of the screen, it may be necessary to make corrections for the initial lenticulation which will compensate for the later distortions.

As seen in FIG. 5, the finished screen is a stand-alone screen made of a continuous piece of material. This overcomes disadvantages of the prior art screens made of a plurality of panels which causes variable distortions across the panel sections so that a continuous uniform gain around the screen and across the joint areas is impossible to achieve.

The combination of a screen formed of a single, continuous, sheet of material, with continuously produced lenticulated basic material, permits the production of a high gain screen.

Although a particular embodiment has been described, this was for the purpose of illustrating, but not limiting, the invention. Various modifications, which will come readily to the mind of one skilled in the art, are within the scope of the invention as defined in the appended claims.

We claim:

1. A method for forming a curved projection screen from a single, continuous sheet of material, comprising:
   providing a cylindrical forming drum having a top end and a bottom end, a top stand-off rim at the top end of said forming drum and a bottom stand-off rim at the bottom end of said forming drum, said forming drum comprising a double-wall cylinder having an inner wall and a concentric outer wall spaced from said inner wall to define an air circulation space between said walls;
   said outer wall having a series of openings;
   said inner wall having an opening for receiving a hose from a source of hot air under pressure;
   said method comprising:
   mounting said sheet of material, having a length and a width, around the outer surface of the forming drum so that the width of the material extends from the bottom to the top end of the forming drum and overlaps the top and bottom stand-off rims;
   clamping said sheet of material to the drum by mounting a first clamp over said sheet of material at the top stand-off rim and a second clamp over said sheet of material at the bottom stand-off rim;
   heating the mounted sheet of material to a forming temperature;
   blowing hot air through said hose and through said opening in said inner wall into said air circulation space, said hot air subsequently being expelled from the air circulation space through the openings in said outer wall to force said material outwardly to assume a shape having a curved cross-section along the width thereof;
   terminating said step of blowing hot air when the correct degree of curvature of the sheet of material has been obtained;
   removing the shaped sheet of material from the forming drum; and
   trimming the shaped sheet of material as required.

2. A method as defined in claim 1 wherein, when said material is mounted on said forming drum, a gap is formed between the two ends of the material;
   and including the step of providing a joint cover strip to close the gap.

3. A method as defined in claim 2, wherein said material comprises an acrylic material.

4. A method as defined in claim 1 wherein said sheet of material has a lenticulated surface, said sheet of material being mounted on said forming drum such that said lenticulated surface faces said outer wall of said forming drum.

5. A method as defined in claim 4 wherein said formed screen is provided with a screen coating.

6. A method as defined in claim 4, wherein said material comprises an acrylic material.

7. A method as defined in any one of claim 1 wherein said material comprises an acrylic material.

* * * * *